United States Patent [19]

Wei

[11] Patent Number: 4,656,687
[45] Date of Patent: Apr. 14, 1987

[54] ELEPHANT-SHAPED CAR CLEANER AND AIR PUMP

[76] Inventor: Yung-Kuan Wei, No. 1, Lane 970, Sec 2, Pen Tien Street, Taiwan, Taiwan

[21] Appl. No.: 817,519

[22] Filed: Jan. 9, 1986

[51] Int. Cl.$^4$ ............................................. A47L 5/24
[52] U.S. Cl. ......................................... 15/324; 15/328; 15/330; 15/339; 15/344; 417/201
[58] Field of Search ................. 15/328, 330, 339, 344, 15/324; 417/62, 199 R, 201, 205

[56] References Cited

U.S. PATENT DOCUMENTS

| | | | |
|---|---|---|---|
| 1,898,153 | 2/1933 | Tamura | 417/204 |
| 2,500,832 | 3/1950 | Kirby | 15/330 X |
| 2,960,713 | 11/1960 | Wistrand | 15/344 |
| 3,026,929 | 3/1962 | Burns | 417/201 X |
| 3,771,192 | 11/1973 | Zaleski | 15/330 |
| 3,934,302 | 1/1976 | Mabuchi | 15/339 |
| 4,175,352 | 11/1979 | Catlett | 15/330 X |
| 4,513,470 | 4/1985 | Toya | 15/339 X |

FOREIGN PATENT DOCUMENTS

| | | | |
|---|---|---|---|
| 795118 | 5/1958 | United Kingdom | 15/344 |
| 803693 | 10/1958 | United Kingdom | 15/344 |

Primary Examiner—Chris K. Moore

[57] ABSTRACT

This invention concerns a car cleaner and air pump shaped like an elephant. It can be used as a vacuum cleaner, e.g. sucking in dirt, and at the same time as an air pump, e.g. pumping pressurized air into a tire. This elephant-shaped car cleaner and air pump consists of an elephant-shaped cover, a dirt sucking device, an air pumping device, a lighting signaling device and an electric power system. The characteristic of the dirt sucking device is that dirt is sucked through the trunk and collected in the dirt bag set in the body by means of a blowing wheel turned by a motor. The characteristic of the air pumping device lies in pumping air by means of a cylinder and a piston that is moved by a set of worm-gear wheel and rod turned by the same motor that is used in the dirt sucking device.

3 Claims, 6 Drawing Figures

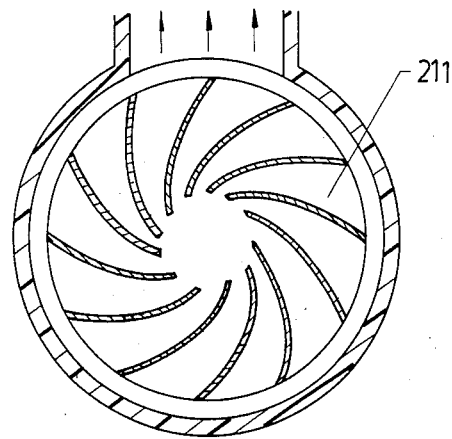
Fig 3 (B-B)
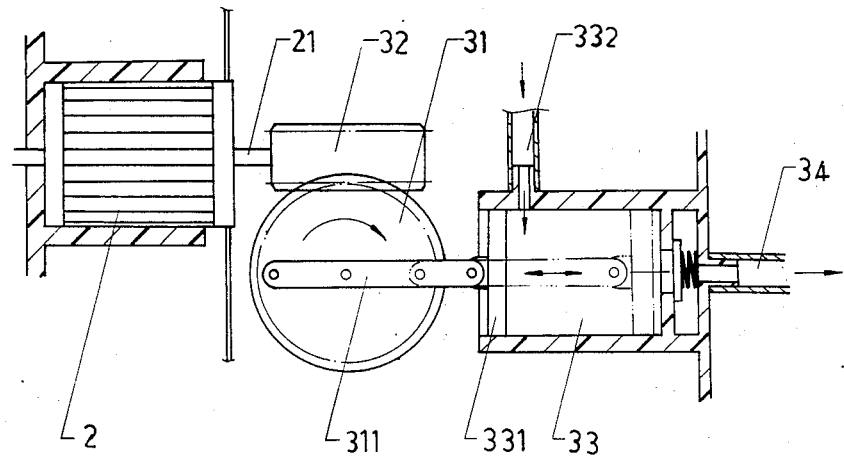
Fig 4

ELEPHANT-SHAPED CAR CLEANER AND AIR PUMP

BACKGROUND OF THE INVENTION

Vacuum cleaners are widely used today for cars, but portable car air pumping devices are seldom seen. If a car tire should be found to be short of air pressure on a highway, such a portable air pumping device might be very convenient for a driver, especially if it would be combined together with a vacuum cleaner, making use of the same motor used in the cleaner. So this car cleaner and air pump has been shaped as an elephant for an attractive appearance.

BRIEF DESCRIPTION OF THE DRAWINGS

FIG. 3 is a cross-sectional view of FIG. 2 along line B—B.

FIG. 4 is a cross-sectional view of the air pumping device of the invention.

DETAILED DESCRIPTION OF THE INVENTION

Figure 1:
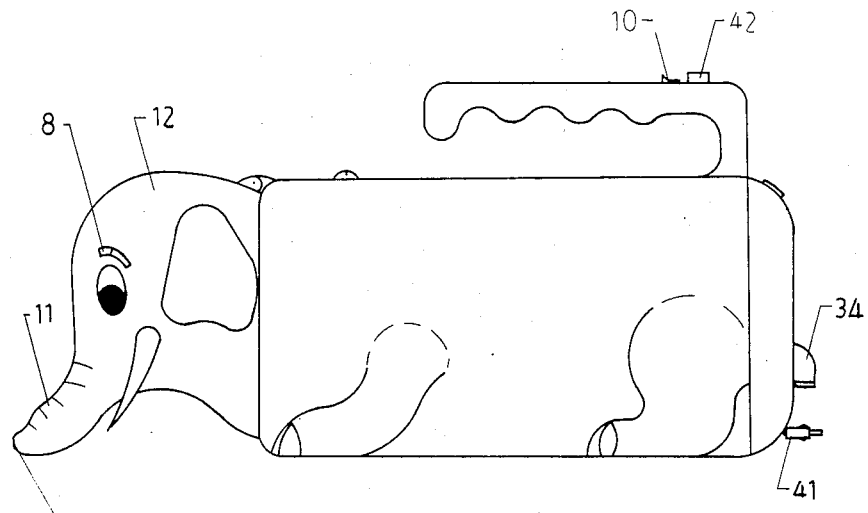
FIG. 1 is a side view of the elephant-shaped car cleaner and air pump of the invention.
Figure 2:
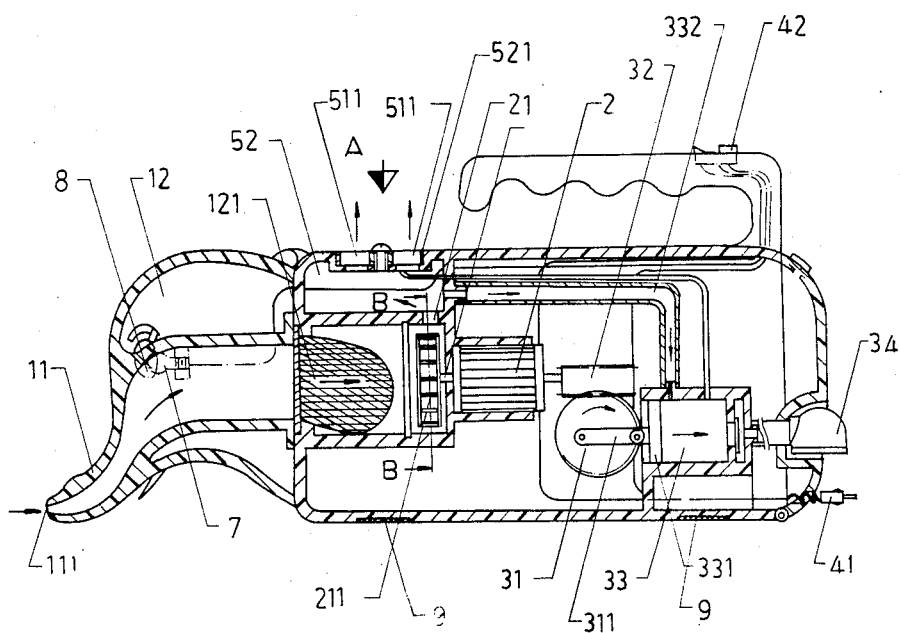
FIG. 2 is a side cross-sectional view of the car cleaner and air pump of the invention.

The elephant-shaped car cleaner and air pump comprises an elephant-shaped cover 1, a dirt sucking device 2, an air pumping device 3 and an electric power system 4. As FIG. 2 shows, the dirt sucking device 1 includes a motor 2, an impeller 211, and a dirt bag 121; the impeller 211 is fixed on one end of shaft 21 of motor 2. The dirt bag 121 is placed upstream of the impeller 211 in order to collect dirt which comes in with the air sucked through an elephant trunk.

The air pumping device, as FIGS. 2 and 4 show, includes the motor 2, which is also used in the dirt sucking device, a transmission consisting of a worm-gear rod 32, a worm-gear wheel 31, and a crank 311; a cylinder 33, a piston 331 and a pressure gauge 6. The worm-gear 32 is fixed on the other end of shaft 21 of the motor 21. An exhaust pipe 332 connects an air chamber 52 with the cylinder 33 to direct the air flow into the cylinder. The piston 331 is combined with the worm-gear wheel by means of a crank 311 so that the piston 331 can be pushed or pulled back and forth in the cylinder 33 by the revolution of the motor 2 through the combination of the worm-gear rod 32, the worm-gear wheel and the crank 311.

Figure 5A:
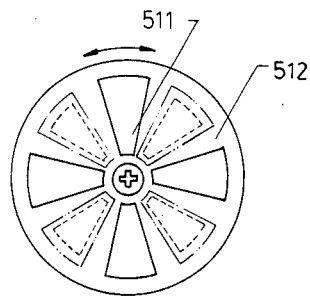
FIG. 5 is a top view of FIG. 2.
Figure 6:
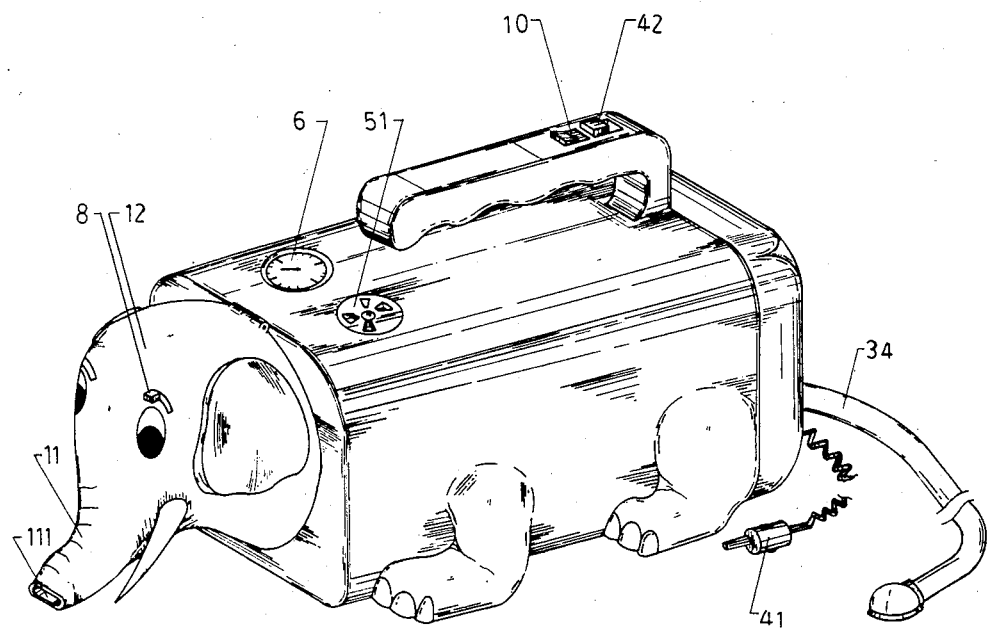
FIG. 6 is the general view of the cleaner and air pump.

The elephant-shaped cover 1 has a trunk-head part and a body part 1. The trunk-head part, as the FIG. 2 shows, has an air way from the tip of the trunk to the dirt bag, and two lights 7 each covered by a multi-colored selectively changeable lens 8, with a switch 10 for turning the lights 7 on or off. On the upper surface of the body part there is set the pressure gauge 6 and a circular valve with four trapezoidal holes 511 as the FIG. 5 shows, which can be shut or opened to selectively allow the air flow out of the air chamber located just above the impeller 211. The body part envelopes the dirt suction device and the air pumping device and is provided with a handle for carrying the appliance.

Next, the operation of the device is as follows: If the dirt suction device is needed to clean up dirt in a car, first the plug of the electric cord is inserted in the outlet of the power line of the car, to drive the motor 2. Next, valve 51 is rotated to the 51 open position and switch 42 is pushed to start motor 2 that turns impeller 211, which sucks the ambient air and dirt through the tip of the trunk 11 into the dirt bag 121. The dirt entrained in the air is collected, and air passing through the bag 121 goes through the exhaust pipe 521 into the air chamber 52, and flows out of the four trapezoid exits 511 into the open air. Though a small part of the air in the air chamber may flow into the exhaust pipe 332 and then into the cylinder 33, that air flow is not sufficient to allow the cylinder to create a pressurized air flow.

When it is desired to use the air pumping device, the dirt bag should first be taken out and emptied of the collected dirt after lifting up the head part of the cover. Next, the lid 51 should be shut by turning valve 51 to make the four trapezoidal lid sections close the four trapezoidal exhaust apertures 511 in order to divert the air sucked in by the impeller 211 into the exhaust pipe 332, and cylinder 33. The piston 331 pressurizes the air coming into the cylinder 33 by means of the crank 311 driven by worm-gear wheel 31 engaged with the worm-gear rod turned by the shaft 21 of the motor 21. Finally the pressurized air flows through the pumping tube 34 into a car tire 1, with pressure gauge 6 indicating the air pressure.

Additionally, the two lights 7 set into the eyes of the trunk-head part of the cover can be used for lighting or colored light signaling by changing the multi-color lenses 8 covering the lights. The device can be placed for colored light signaling, on the car roof and secured thereto by the magnetic power of the magnets 9 attached to the bottom of the cover.

I claim:

1. An elephant-shaped car vacuum cleaner and air pump, including: an elephant-shaped cover, a dirt suction device consisting of an inlet passage, a motor, an impeller driven by the motor, and a dirt bag; an air pumping device consisting of said motor, a transmission consisting of a worm gear rod, a worm-gear wheel, and an eccentric crank; and a cylinder with a piston driven by said transmission; a lighting and colored-light signaling device, and an electric power system; having the characteristics that dirt can be suctioned and collected in the dirt bag through said inlet passage in a trunk of said cover by the suction created by the impeller turned by the motor; and that air can be pumped by compressing the air coming into the cylinder through an exhaust pipe from the impeller by means of the piston driven by the transmission.

2. The elephant-shaped car vacuum and air pump as set forth in claim 1, wherein the head portion of the cover is able to be lifted open for cleaning and emptying the dirt bag, and the body portion of the cover has on its upper surface a pressure gauge and a circular valve for closing or venting the air chamber to the atmosphere, so that for pumping air into a tire, the valve can be closed to make the air flow into the cylinder, and the air pressure in the cylinder indicated by the gauge.

3. The elephant-shaped car vacuum and air pump as set forth in claim 1, wherein the lighting or colored-light signalling is accomplished by at least one light set into at least one eye in a head portion of the cover, and covered by a multi-colored lens able to change its color from red to green or transparent.

* * * * *